United States Patent
Anand et al.

(10) Patent No.: US 10,492,020 B2
(45) Date of Patent: Nov. 26, 2019

(54) GEOGRAPHICAL CONTEXTUAL INFORMATION

(71) Applicants: Karishma Anand, Menlo Park, CA (US); Deborah Galdes, Los Altos, CA (US); Christopher Hoffmann, Athens, GA (US); Puneet Kumar, Foster City, CA (US); Soon Clarissa, Mountain View, CA (US); Vijay Yellapragada, Sunnyvale, CA (US); Wing Yip, Foster City, CA (US); Marshall Yuan, Saratoga, CA (US); Suzan Szollar, Menlo Park, CA (US)

(72) Inventors: Karishma Anand, Menlo Park, CA (US); Deborah Galdes, Los Altos, CA (US); Christopher Hoffmann, Athens, GA (US); Puneet Kumar, Foster City, CA (US); Soon Clarissa, Mountain View, CA (US); Vijay Yellapragada, Sunnyvale, CA (US); Wing Yip, Foster City, CA (US); Marshall Yuan, Saratoga, CA (US); Suzan Szollar, Menlo Park, CA (US)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 14/554,448

(22) Filed: Nov. 26, 2014

(65) Prior Publication Data

US 2016/0150367 A1    May 26, 2016

(51) Int. Cl.
*H04W 4/021*    (2018.01)
*G06Q 30/02*    (2012.01)
*H04W 12/06*    (2009.01)

(52) U.S. Cl.
CPC ........ *H04W 4/021* (2013.01); *G06Q 30/0261* (2013.01); *H04W 12/06* (2013.01)

(58) Field of Classification Search
CPC ..... H04W 4/021; H04W 12/08; H04W 4/027; H04W 12/06; H04W 4/008; H04W 4/02; H04W 4/14; H04W 4/24; H04W 64/00; H04W 4/023; H04W 4/04; H04W 4/043; H04W 4/206; H04W 84/045; H04W 8/18
USPC ....................................... 455/456.3
See application file for complete search history.

(56) References Cited

U.S. PATENT DOCUMENTS

| | | | | |
|---|---|---|---|---|
| 8,755,824 | B1* | 6/2014 | Wang | H04W 4/021 340/539.13 |
| 2013/0091452 | A1* | 4/2013 | Sorden | G06F 3/048 715/771 |
| 2013/0275221 | A1* | 10/2013 | Zeto, III | G06Q 30/0261 705/14.58 |
| 2014/0155094 | A1* | 6/2014 | Zises | H04W 4/021 455/456.3 |
| 2015/0176998 | A1* | 6/2015 | Huang | G01C 21/20 701/400 |

\* cited by examiner

*Primary Examiner* — Kwasi Kariakari
(74) *Attorney, Agent, or Firm* — Schwegman, Lundberg & Woessner

(57) ABSTRACT

A mobile application is configured for providing contextual information to a consumer operating a mobile device and/or reporting contextual information to an enterprise service about the mobile device. The contextual information is provided or reported when the mobile device is detected within a geofence area; the geofence area surrounds a retailer of interest to the consumer.

17 Claims, 4 Drawing Sheets

GEOGRAPHICAL CONTEXTUAL INFORMATION

BACKGROUND

A variety of services exist to provide consumers near real-time offers from retailers. Most of these services are ignored and not even desired by the consumer. Typically, a consumer has a generic application on his/her mobile phone and the mobile application communicates the geographical position of the mobile phone to a service. The service also maintains a listing of subscribing retailers and when the mobile device is detected within the service's defined range of a subscribing retailer a pop message is displayed on the mobile phone. Many times the consumers become frustrated with these pop ups and will often turn off, de-install, and/or manually stop the mobile application from running on the mobile phone.

As a result many of these services have been largely unsuccessful because they are driven by subscribing retailers that pay for the pop-up messages. Additionally, the location of the consumer is irrelevant, meaning whether the consumer is traveling away from home or at home the messages appear. This is significant because many times the consumer is not interested in any offers while traveling and in most cases is only interested near the consumer's home.

Therefore, there is a need to provide improved real-time offers in geographical areas that are likely to elicit interest of a consumer.

SUMMARY

In various embodiments, methods and a system for providing contextual geographical information are presented.

According to an embodiment, a method for providing contextual geographical information is presented.

Specifically, a customer is authenticated for receiving geofence contextual information. Next, the geofence contextual information is dynamically and selectively provided to a mobile device of the customer when the mobile device is identified within a geofence area defined for the customer.

DETAILED DESCRIPTION

Figure 1:
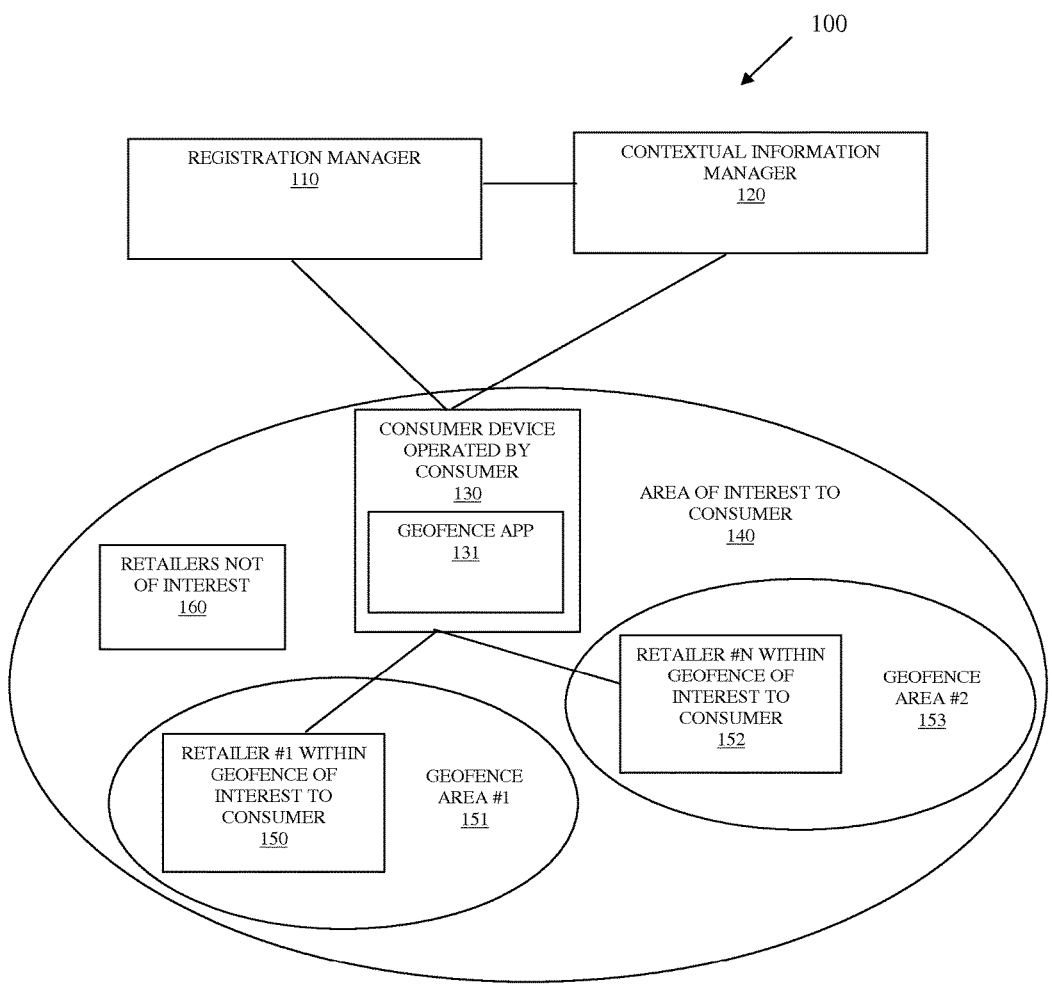
FIG. 1 is a diagram of a geographical contextual information system, according to an example embodiment.

FIG. 1 is a diagram of a geographical contextual information system 100, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of providing geographical contextual information, presented herein and below.

The geographical contextual information system 100 includes a registration manager 110, a contextual information manager 120, a mobile device operated by a consumer 130, an area of interest or deemed to be of interest to the consumer 140, retailers of interest to the consumer 150 and 153 within geofences 151 and 153, respectively, and retailers not of interest to the consumer 160. The consumer device 130 includes a geofence mobile application 131.

Initially, a consumer operating the consumer's mobile device 130 registers with a network-based registration manager 110 using an interface provided by the geofence application (app) 131 on the mobile device 130. It is noted, that registration can occur via any consumer device, such as but not limited to a laptop and or a desktop where the consumer accesses a website to interact with the registration manager. So, registration can occur via the mobile device 130, via another consumer operated device, or in person by the consumer with a clerk that registers the consumer.

Additionally, the geofence app 131 can be acquired in a number of manners by the consumer. For example, the consumer can use a camera integrated into the mobile device 130 to scan a Quick Response (QR) code or a barcode available in print media or at a retailer location, such as the consumer's financial institution. The scanning automatically initiates a download and automatic installation of the geofence app 131 on the mobile device 130. When the consumer first initiates the geofence app 131 on the mobile device 130, the registration process is initiated.

In an embodiment, the registration manager 110 is integrated into or part of the same server or associated with a same enterprise that provides the contextual information manager 120.

In an embodiment, the registration manager 110 is executed on a different server and/or associated with a different enterprise from that which is associated with the contextual information manager 120.

In an embodiment, the contextual information manager 120 is maintained, owned, operated, and/or affiliated with a financial institution of the consumer, such as the consumer's bank. Thus, the consumer is already a customer of such financial institution at the time that the consumer downloads and installs the geofence app 131 onto the consumer's mobile device 130.

In some cases, the contextual information manager 120 interacts with the financial institution through an API or interface and permits the financial institution to determine what categories of retailers or service providers are of interest for purposes of geofencing those retailers or service providers for their financial consumers.

During registration (through any of the mechanisms discussed above), the consumer operates a device to interact with an interface associated with the registration manager 110. The consumer's mobile device's identifier is acquired (either manually as provided by the consumer or automatically such as when the registration occurs via the geofence app 131). In an embodiment, the mobile device's identifier is a phone number. In an embodiment, the mobile device 130 is one of: a phone, a tablet, a laptop, a wearable processing device, and the like.

The registration process acquires the necessary consent to display offers to and/or record and report locations of the consumer and depending on the financial institution's configuration may ask the consumer to select specific retailers, categories of retailers, service providers, and/or categories of service providers that the consumer is interested in acquiring real-time or near-real time offers from via the geofence app 131.

Also during the registration process (processed by the registration manager 110), the consumer may be asked to provide a zip code for their primary residence. It is noted that if the consumer is already a customer of an enterprise associated with the contextual information manager 120 then such zip code is already known and not required to be provided by the consumer; rather, the contextual information manager 120 can acquire the zip code for the primary residence based on the consumer's name or consumer account.

In a case where the consumer is already a customer of an enterprise associated with contextual information manager 120, the registration manager 110 may ask the consumer if the consumer has an account with such enterprise and if so to either provide some identifying information to link to that account or to provide credentials to log into a service associated with that account. Once this is done, the registration manager 120 is capable of linking to the primary address of the consumer and obtains the current zip code for such primary address.

So, in some cases, the registration process may be as simple as the consumer identifying that he/she is an account holder of a given enterprise and providing credentials for logging into a service of that enterprise or providing identifying information for locating an account of the consumer for that enterprise. The consumer during this simplified registration process still provides consent for the real-time or near real-time offers and identifies retailers or service providers of interest as discussed above.

Once the consumer has the geofence app 131 installed and executing on the mobile device 130 and has registered for the services of the contextual information manager 120, the geofence app 131 and the contextual information manager 120 cooperate to provide real time or near real-time geographical contextual information to the consumer on the mobile device 130 or provide real time or near real-geographical contextual information about the location of the consumer back to the enterprise.

The contextual information manager 120 configures itself for providing the contextual information to the geofence app 131 by using the zip code for the primary residence of the consumer to establish an initial area of interest 140 to the consumer or deemed to be of interest to the consumer by the enterprise. Contextual information is only presented to the consumer on the mobile device 130 through the geofence app 131 when the consumer is identified to be within geofence areas 151 and/or 153. Thus, when the consumer is outside the geofence area no contextual information is provided by the contextual information manager 120 to the geofence app 131 and/or no contextual information about the location of the consumer is provided to the enterprise.

The contextual information manager 120 configures the geofence app 131 by sending geographical coordinates that define the geofence areas 151 and 153. The geographical coordinates are obtained for retailers 150 and 152 identified of interest to the consumer and within the area of interest 140 based on the primary residence and/or zip code for the primary residence of the consumer.

Again, in an embodiment, the financial institution of the consumer may interact with the contextual information manager 120 to decide on what categories of retailers to include for geofences 150 and 152.

The area of interest 140 uses the primary address of the consumer's zip code to establish a geographical area defined as the area or interest 140. In an embodiment, the area of interest 140 may expand beyond the borders of the consumer's primary zip code to adjacent zip codes. The range of the area of interest 140 is configurable and defined by the enterprise associated with the contextual information manager 120. The center point of the geographical range that defines the area of interest 140 is also configurable and defined by the enterprise. In an embodiment, the center point of the area of interest 140 is the location of the consumer's primary residence within the zip code. In an embodiment, the center point of the area of interest 140 is a geographical location identified as a center of the primary residence's zip code. In an embodiment, the center point of the area of interest 140 is defined based on a particular area of commerce or location identified by the enterprise for the primary residence's zip code.

The geofence app 131 receives the coordinates for defining the geofence areas 151 and 153 from the contextual information manager 120. The geographic range of that surrounds the coordinates can also be defined by contextual information manager 120. The geographical range for the geofences 151 and 153 radiates from the coordinates for the retailers 150 and 152 from the property location or the retailers 150 and 152 and, perhaps, to one or more adjacent premises of a particular retailer 150 and 152 of interest to the consumer. So, each geofence area 151 or 153 is defined to be a relatively small geographical area for a particular retailer 150 or 152. Again, the geofences 151 and 153 are defined by the contextual information manager 120 through the coordinates for the retailers 150 and 152 and the geographical range. In an embodiment, the geofence app 131 registers geofence areas 151 and 153 with Google® Play Location Services™ on the consumer's mobile device 130 to determine when the mobile device 130 operated by the consumer is within one of the geofence areas 151 and 153.

During operation the geofence app 131 listens for Google® Play Location Services™ which is keeping track of the current geographical location of the mobile device 130 operated by the consumer and also knows when the mobile device 130 is within a geofence area 151 and 153. When this occurs the Google® Play Location Services™ sends the entry event to the geofence app 131 which can either immediately report that the consumer is at a retailer of interest 150 or 152 to the contextual information manager 120 or can be configured to just report that the consumer is at a retailer of interest 150 or 152 to the contextual information manager 120 when the consumer remains at such retailer 150 or 152 for a configurable period of time, such as but not limited to 5 minutes.

Depending upon how the financial institution of the consumer has configured the contextual information manager 120 and the geofence app 131, the contextual information manager 120 decides based on business rules or policy as to what content to preload to the geofence app 131. When the geofence app 131 registers that the geofence area 151 or 153 has been triggered, it can just record and log the fact that the consumer was at the retailer 150 or 152, or it can provide offers, informational messages, and the like for display on the mobile device 130 based on the content that the contextual information manager 120 has preloaded. In an embodiment, when offers are provided as the contextual information the contextual information manager 120 may use the account or loyalty level associated with the consumer to determine whether such offers are one that the consumer is eligible to receive before such offers are provided as the contextual information to the geofence app 131.

The geofence app 131 then displays any provided contextual information in a screen rendered on the display of the mobile device 130 for the consumer to see.

The contextual information can be delivered in a variety of manners to the geofence app 131 for presentation within a screen rendered on a display of the mobile device 130. For example, the contextual information may be delivered as a text message, as a bar code, as a QR code, as a short video, as an audio tone, as an audio message, etc.

The contextual information may or may not be a discount. For example, the contextual information may just be a description of services available at a retailer (can also be a service provider) that is of interest to the consumer.

In an embodiment, the contextual information manager 120 may have separately agreements with the retailers 150 and 152 that are of interest to the consumer and within the geofences 151 and 153. These agreements may provide deals to just customers of the contextual information manager 120, such as the consumer in the continuing example. The agreements may also provide referral fees back to the enterprise associated with the contextual information manager 120 or even smaller transaction based fees for providing the contextual information to the consumer.

In an embodiment, the enterprise is a bank of the consumer and the retailers 150 and 152 of interest are financial service providers, such as but not limited to loan officers, car dealerships, investment firms, law offices, and the like. As an example, consider that the consumer is interested in purchasing a car and a car dealership is providing favorable loan terms to consumers of the bank that have a certain balance or type of account (akin to loyalty level within the bank). When the consumer is within the geofence area 151 and the car dealership is also within the geofence area 151 and identified as a retailer 150 of interest to the consumer, the geofence app 131 will display the favorable loan terms preloaded on the mobile device 130 by the contextual information manager 120 (after receiving the event notification from Google® Play Location Services™ that the consumer is at the coordinates saved by the geofence app 131), and the geofence app 131 renders those favorable loan terms for that car dealership to a screen on a display of the mobile device 130 for the consumer to inspect.

It is noted that this is but one example and many more are conceivable and possible with the geographical contextual information system 100 presented with the discussion of the FIG. 1.

In an embodiment, the contextual information manager 120 uses business rules that it dynamically evaluates to determine whether the consumer is eligible for a retailer-provided deal based on a consumer account associated with an enterprise of the contextual information manager 120. So, in some situations, a deal (type of contextual information) may be available and may be provided by retailers 150 and 152 of interest to the consumer; however, the consumer may not see such deal on the mobile device 130 when the consumer is in the geofences 151 and 152 because the consumer is ineligible for the deal. So, the consumer only sees deals or offers as the contextual information to which the consumer is interested in and to which the consumer is eligible for.

In an embodiment, the contextual information manager 120 is integrated within and part of a consumer's financial institution, such that when the consumer activates the geofence app 131 the consumer is asked to log into the financial institution with the proper credentials.

In an embodiment, the consumer has to be within the geofence areas 150 and 152 for a configurable period of time (defined by the enterprise associated with the contextual information manager 120 and communicated by the geofence app 131) before the geofence app 131 will trigger to show any eligible offers preloaded from the contextual information manager 120 or other contextual information to be pushed to the geofence app 131 on the mobile device 130.

In an embodiment, the geofence app 131 presents the contextual information in categories of interest to the consumer for the consumer to activate at a category level on the mobile device 130 to drill down to specific retailers and specific contextual information relevant to those specific retailers. So, the geofence app 131 can present the contextual information within an interactive hierarchical interface based on categories to the consumer.

In an embodiment, the area of interest 140 based on an enterprise determined radius that begins at the primary residence of the consumer within the zip code of that address. In some cases (and as previously stated), the radius may extend outside the primary address's zip code to one or more zip codes that are adjacent to the primary address's zip code.

Some of embodiments of the FIG. 1 and other embodiments are now discussed with reference to the FIGS. 2-4.

Figure 2:
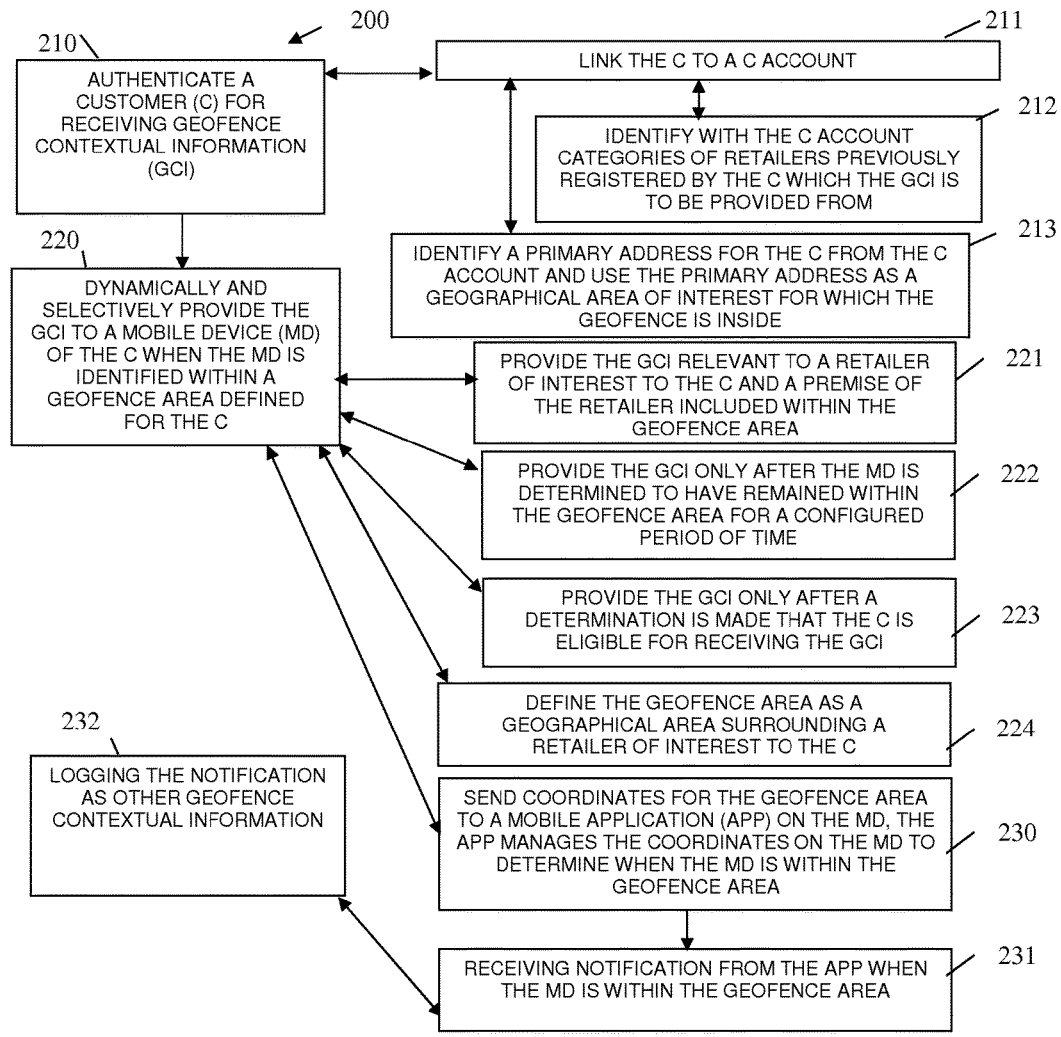
FIG. 2 is a diagram of a method for providing geographical contextual information, according to an example embodiment.

FIG. 2 is a diagram of a method for providing geographical contextual information, according to an example embodiment. The software module(s) that implements the method 200 is referred to as a "contextual information manager." The contextual information manager is implemented as executable instructions programmed and residing within memory and/or a non-transitory computer-readable (processor-readable) storage medium and executed by one or more processors of a device. The processor(s) of the device that executes the contextual information manager are specifically configured and programmed to process the local device contextual information manager. The contextual information manager has access to one or more network connections during its processing. The network connections can be wired, wireless, or a combination of wired and wireless.

In an embodiment, the contextual information manager is the contextual information manager 120 of the FIG. 1.

In an embodiment, the contextual information manager is a combination of the registration manager 110 and the contextual information manager 120 of the FIG. 1.

In an embodiment, the device that executes the contextual information manager is a part of a cloud-based processing environment.

In an embodiment, the device that executes the contextual information manager is part of a retail establishment.

In an embodiment, the device that executes the contextual information manager is part of a financial institution.

At 210, the contextual information manager authenticates a customer for receiving geofence contextual information. That is, the server that executes the contextual information manager authenticates the customer for access to the services and features associated with the contextual information manager.

According to an embodiment, at 211, the contextual information manager links the customer to a customer account. In an embodiment, the customer account is a financial institution of the customer.

In an embodiment of 211 and at 212, the contextual information manager identifies with the customer account categories of retailers that were previously registered by the customer for which the geofence contextual information is to be provided from. This was discussed above with the description of the FIG. 1.

In an embodiment of 211 and at 213, the contextual information manager identifies a primary residential address for the customer from the customer account and uses that address as a geographical area of interest for which the geofence area is inside. Other center points for the area of interest 140 were discussed above with the discussion of the FIG. 1.

At 220, the contextual information manager dynamically and selectively provides the geofence contextual information to a mobile device of the customer when the mobile device is identified within the geofence area defined and constructed for the consumer.

According to an embodiment, at 221, the contextual information manager provides the geofence contextual information that is deemed relevant to a retailer of interest to the customer and a premise of the retailer included within the geofence area. The retailer of interest can be identified during a registration process by the customer as discussed above with the FIG. 1. Moreover, an interface provided to the customer on the customer's mobile device may permit the customer to update retailers of interest to the customer at any time desired by the customer or as the needs and wants of the customer change.

In an embodiment, at 222, the contextual information manager provides the geofence contextual information only after the mobile device is determined to have remained within the geofence area for a configured period of time. This configured period of time can be set by the enterprise associated with the contextual information manager or, if desired, by the customer during registration or later updated by the customer.

In an embodiment, at 223, the contextual information manager provides the geofence contextual information only after a determination is made that the customer is eligible for receiving the geofence contextual information. This can be done based on a loyalty level of the customer or an account type held by the customer with an enterprise and conditions associated with the geofence contextual information as set by a retailer.

In an embodiment, at 224, the contextual information manager defines the geofence area as a geographical area surrounding a retailer of interest to the customer.

In an embodiment, at 230, the contextual information manager sends coordinates for the geofence area to a mobile application on the mobile device. The mobile application manages the coordinates on the mobile device to determine when the mobile device is within the geofence area.

In an embodiment or 230 and at 231, the contextual information manager receives notification from the mobile application when the mobile device is within the geofence area.

In an embodiment of 231 and at 232, the contextual information manager logs the notification as other geofence contextual information. This detail may be of value to the enterprise or partners of the enterprise, such as how many customers of the enterprise are visiting a particular retailer (based on the geofence area around that retailer).

Figure 3:
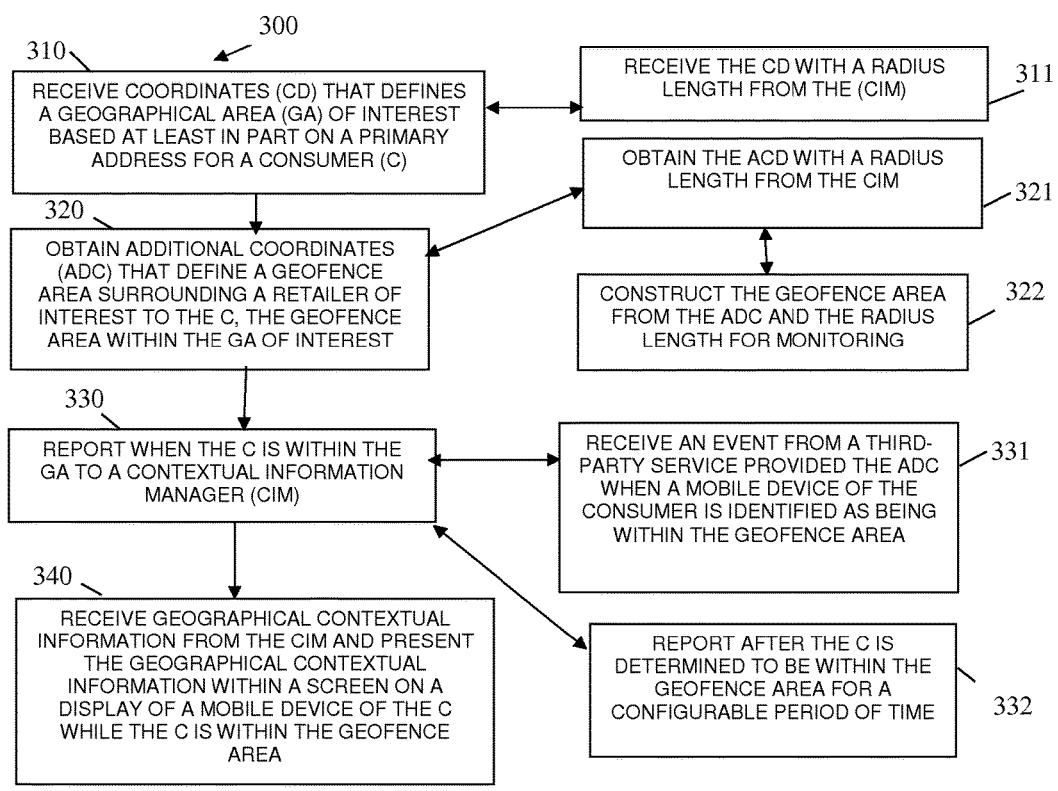
FIG. 3 is a diagram of another method for providing geographical contextual information, according to an example embodiment.

FIG. 3 is a diagram of another method 300 for providing geographical contextual information, according to an example embodiment. The software module(s) that implements the method 300 is referred to as a "geofence application (app)." The geofence app is implemented as executable instructions programmed and residing within memory and/or a non-transitory computer-readable (processor-readable) storage medium and executed by one or more processors of a device. The processors that execute the geofence app are specifically configured and programmed to process the geofence app. The geofence app has access to one or more network connections during its processing. The network connections can be wired, wireless, or a combination of wired and wireless.

In an embodiment, the device that executes the geofence app is the mobile device 130 of the FIG. 1.

In an embodiment, the device that executes the geofence app is one of: a mobile phone, a tablet, a laptop, and a wearable processing device.

In an embodiment, the geofence app is the geofence app 131 of the FIG. 1.

The geofence app interacts with the method 200 of the FIG. 2 to provide real-time or near real-time contextual information to consumers or report real-time or near real-time contextual information to an enterprise service.

At 310, the geofence app receives coordinates that defines a geographical area of interest based at least in part on a primary address of a consumer.

According to an embodiment, at 311, the geofence app receives the coordinates with a radius length from the contextual information manager.

At 320, the geofence app obtains additional coordinates that define a geofence area surrounding a retailer of interest to the consumer. The geofence area is within the geographical area of interest.

In an embodiment, at 321, the geofence app obtains the additional coordinates with a radius length from the contextual information manager.

In an embodiment of 321 and at 322, the geofence app constructs the geofence area from the additional coordinates and the radius length for monitoring.

At 330, the geofence app reports when the consumer is within the geofence area to a contextual information manager. In an embodiment, the contextual information manager is the contextual information manager 120 of the FIG. 1. In an embodiment, the contextual information manager is the method 200 of the FIG. 2.

In an embodiment, at 331, the geofence app receives an event from a third-party service provided the additional coordinates when a mobile device of the consumer is identified as being within the geofence area. In an embodiment, the third-party service is Google® Play Location Services™.

In an embodiment, at 332, the geofence app reports after the consumer is determined to be within the geofence area for a configurable period of time.

According to an embodiment, at 340, the geofence area receives geographical contextual information from the contextual information manager and presents the geographical contextual information within a screen on a display of a mobile device of the consumer while the consumer is within the geofence area.

Figure 4:
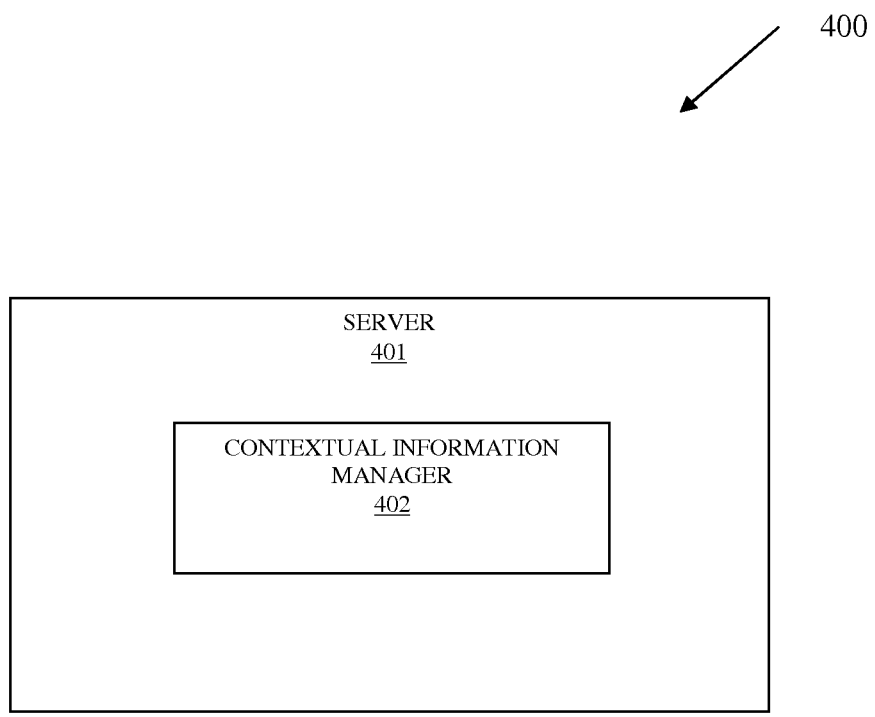
FIG. 4 is a diagram of a geographical contextual information system, according to an example embodiment.

FIG. 4 is a diagram of a geographical contextual information system 400, according to an example embodiment. The geographical contextual information system 400 includes a variety of hardware components and software components. The software components of the geographical contextual information system 400 are programmed and reside within memory and/or a non-transitory computer-readable medium and execute on one or more processors of the geographical contextual information system 400. The geographical contextual information system 400 communicates over one or more networks, which can be wired, wireless, or a combination of wired and wireless.

In an embodiment, the geographical contextual information system 400 implements, inter alia, the processing discussed above with the FIG. 1.

In an embodiment, the geographical contextual information system 400 implements, inter alia, the processing discussed above with the FIG. 2.

In an embodiment, the geographical contextual information system 400 implements, inter alia, the processing discussed above with the FIG. 3.

The geographical contextual information system 400 includes an enterprise server 401 and a contextual information manager 402.

In an embodiment, the enterprise server 401 is part of a cloud processing environment.

In an embodiment the enterprise server 401 is part of a financial institution's processing environment.

The contextual information manager 402 is adapted and configured to: execute on the enterprise server 401, establish coordinates for a geofence area to monitor for a customer, and deliver to a mobile device of the customer the coordinates for the mobile device to report when the mobile device of the customer is within the geofence area for a configurable period of time.

In an embodiment, the contextual information manager 402 is the contextual information manager 120 of the FIG. 1.

In an embodiment, the contextual information manager 402 is the method 200 of the FIG. 2.

According to an embodiment, the contextual information manager 402 is further adapted and configured to deliver contextual information to the mobile device for presentation to the customer only when the customer is eligible for the contextual information based on an account of the customer.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   authenticating, at a server, a customer for receiving geofence contextual information; and
   dynamically and selectively providing the geofence contextual information to a mobile device of the customer when the mobile device is identified within a geofence area defined for the customer, and wherein dynamically and selectively providing further includes providing the geofence contextual information only after the mobile device is determined to have remained within the geofence area for a configured period of time that is defined by the customer during registration or later updated by the customer, wherein dynamically and selectively providing further includes determining the geofence contextual information based on processing preloaded information associated with the geofenced area against customer eligibility rules that are defined for the preloaded information on offers being provided by a business within the geofence area in order to provide the geofence contextual information, wherein determining further includes determining the geofenced contextual information based on at least one customer eligibility rule associated with a customer account type for the customer and conditions set by the business.

2. The method of claim 1, wherein authentication further includes linking the customer to a customer account.

3. The method of claim 2, wherein linking further includes identifying with the customer account categories of retailers previously registered by the customer for which the geofence contextual information is to be provided from.

4. The method of claim 2, wherein linking further includes identifying a primary address for the customer from the customer account and using the primary address as a geographical area of interest for which the geofence area is inside.

5. The method of claim 1, wherein dynamically and selectively providing further includes providing the geofence contextual information as information that is relevant to a retailer of interest to the customer and a premise of the retailer included within the geofence area.

6. The method of claim 1, wherein dynamically and selectively providing further includes providing the geofence contextual information only after a determination is made that the customer is eligible for receiving the geofence contextual information.

7. The method of claim 1, wherein dynamically and selectively providing further includes defining the geofence area as a geographical area surrounding a retailer of interest to the customer.

8. The method of claim 1 further comprising, sending coordinates for the geofence area to a mobile application on the mobile device, wherein the mobile application manages the coordinates on the mobile device to determine when the mobile device is within the geofence area.

9. The method of claim 8 further comprising, receiving notification from the mobile application when the mobile device is within the geofence area.

10. The method of claim 9 further comprising, logging the notification as other geofence contextual information.

11. A method, comprising:
    receiving coordinates that defines a geographical area of interest based at least in part on a primary address of a consumer;
    obtaining additional coordinates that define a geofence area surrounding a retailer of interest to the consumer, the geofence area within the geographical area of interest;
    reporting when the consumer is within the geofence area to a contextual information manager, wherein reporting further includes reporting after the consumer is determined to be within the geofence area for a configurable period of time that is defined by the consumer during registration or later updated by the consumer;

receiving geographical contextual information from the contextual information manager by the contextual information manager processing preloaded information for the geofence area against customer eligibility rules that are defined for the preloaded information on offers being provided by a business within the geofence area and by the contextual information manager providing the contextual information within the geofence area, wherein providing the contextual information further includes determining the contextual information based on at least one customer eligibility rule associated with a customer account type for the customer and conditions set by the business; and presenting the geographical contextual information within a screen on a display of a mobile device of the consumer while the consumer is within the geofence area.

12. The method of claim 11, wherein receiving further includes receiving the coordinates with a radius length from the contextual information manager.

13. The method of claim 11, wherein obtaining further includes obtaining the additional coordinates with a radius length from the contextual information manager.

14. The method of claim 13, wherein obtaining further includes constructing the geofence area from the additional coordinates and the radius length for monitoring.

15. The method of claim 11, wherein reporting further includes receiving an event from a third-party service provided the additional coordinates when a mobile device of the consumer is identified as being within the geofence area.

16. A system, comprising:
a server; and
a contextual information manager configured:
i) execute on the server, ii) establish coordinates for a geofence area to monitor for a customer, and iii) deliver to a mobile device of the customer the coordinates for the mobile device to report when the mobile device of the customer is within the geofence area for a configurable period of time that is defined by the customer during registration or later updated by the customer, the contextual information manager further configured to determine geofence contextual information based on processing preloaded information associated with the geofenced area against customer eligibility rules that are defined for the preloaded information on offers being provided by a business within the geofence area in order to provide the geofence contextual information to the mobile device while the mobile device is within the geofenced area, wherein the geofence contextual information is provided based on determining the geofence contextual information by processing at least one customer eligibility rule associated with a customer account type for the customer and conditions set by the business.

17. The system of claim 16, wherein the contextual information manager is further configured to: iv) deliver contextual information to the mobile device for presentation to the customer only when the customer is eligible for the contextual information based on an account of the customer.

* * * * *